(12) United States Patent
Li

(10) Patent No.: US 6,312,144 B1
(45) Date of Patent: Nov. 6, 2001

(54) OPTICAL SYSTEM HAVING RETRO-REFLECTORS

(75) Inventor: Kenneth K. Li, Arcadia, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 0 days.

(21) Appl. No.: 09/531,962

(22) Filed: Mar. 21, 2000

(51) Int. Cl.$^7$ .................................................. F21V 7/00
(52) U.S. Cl. ..................... 362/297; 362/551; 362/560; 362/298; 362/301; 362/302
(58) Field of Search .................................. 362/297, 550, 362/551, 298, 301, 302, 303, 304, 305

(56) References Cited

U.S. PATENT DOCUMENTS

| | | | |
|---|---|---|---|
| 4,956,759 | 9/1990 | Goldenberg et al. | 362/297 |
| 4,957,759 | 9/1990 | Swartzel et al. | 426/399 |
| 5,414,600 | * 5/1995 | Strobl et al. | 362/551 |
| 5,430,634 | 7/1995 | Baker et al. | 362/552 |
| 5,757,431 | 5/1998 | Bradley et al. | 348/373 |

* cited by examiner

*Primary Examiner*—Sandra O'Shea
*Assistant Examiner*—Ronald E. DelGizzi
(74) *Attorney, Agent, or Firm*—Rothwell, Figg, Ernst & Manbeck

(57) ABSTRACT

A method and system for condensing and collecting electromagnetic radiation onto a target surface comprised generally of a radiation source, a primary reflector and a retro-reflector having a shape complementary to the shape of the primary reflector is disclosed. The primary reflector has a reflecting surface for reflecting the radiation from the source which is substantially concave in shape. The radiation source emits substantially uniform radiation flux in substantially all directions which is collected by the primary reflector and redirected toward the target surface. The retro-reflector, having a complementary shape which depends upon the shape of the primary reflector, is positioned so as to intercept a portion of the radiation redirected toward the target surface. The retro-reflector reflects the intercepted portion of the radiation back toward said primary reflector along the same path such that the redirected radiation is channeled back through the source. In such a manner, flux density at the target surface is improved.

18 Claims, 8 Drawing Sheets

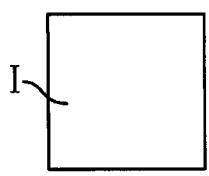
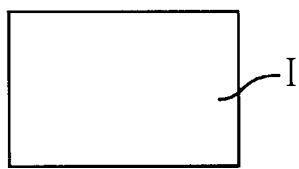
FIG. 10A    FIG. 10B
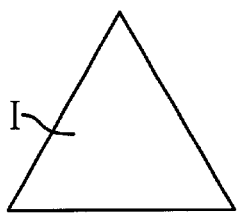
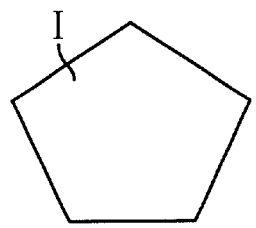
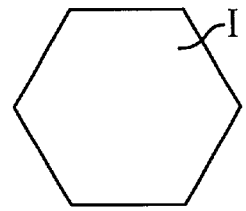
FIG. 10C    FIG. 10D    FIG. 10E
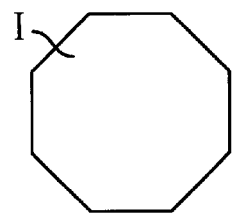
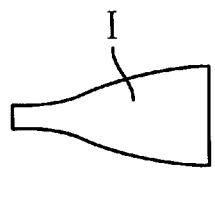
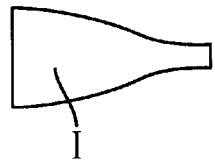
FIG. 10F    FIG. 12A    FIG. 12B
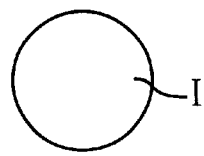
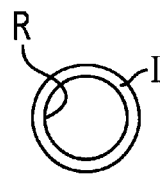
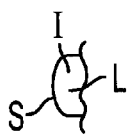
FIG. 11    FIG. 13    FIG. 14

OPTICAL SYSTEM HAVING RETRO-REFLECTORS

FIELD OF THE INVENTION

The present invention relates to methods and systems for increasing the flux density of light exiting a source of electromagnetic radiation by retro-reflection.

BACKGROUND OF THE INVENTION

One of the major goals when collecting and condensing radiation, particularly visible light, from a source onto a target surface is the maximization of the flux density, or brightness, of the light at the target surface. Various configurations using on-axis elliptical and parabolic reflectors, and off-axis reflectors of various shapes have been used. Since the brightness of the image created at the target theoretically only can be conserved in an ideal optical system (and is reduced in a non-ideal system) it is impossible to increase the total flux at the target above the amount which is emitted by the source.

Specifically in the area of optical condensing and collecting systems which use reflectors, the fundamental system, exemplified by FIG. 1a, is comprised of a primary reflector 2 having a generally concave shape. Concave reflectors having a variety of shapes are known in the art, including spherical, paraboloidal, ellipsoidal, and torroidal reflectors. FIG. 1a specifically depicts a common ellipsoidal shaped concave reflector 2 which has two focal points 4 and 5. In such an ellipsoidal system, typically the source 1 of radiation will be placed near one focus 4, and the target surface 3, typically the input end of an optical fiber, homogenizer, or lens, is located near the other focus 5. One of the natural reflecting properties of an ellipsoidal shaped reflector is that light emitted at one of its foci will be collected and focused onto its other focus.

A technique commonly used by the prior art to combat the fundamental limitation that the total flux at the target surface must be at most equal to the flux emitted by the source is the use of an arc lamp as the source in combination with a retro-reflector. This combination takes the light emitted from one side of the arc lamp and redirects it with the retro-reflector back through the arc of the lamp. Since the absorption of the reflected light by the arc is very small, light emitted from the opposite side of the arc lamp when a retro-reflector is used is comprised of both the light radiating from the arc itself as well as the retro-reflected light. Thus, the total light flux emitted from the side of the lamp opposite the retro-reflector is effectively doubled. Other prior art methods have extended this concept by reflecting light from the arc back into itself multiple times, thus increasing the flux further as in U.S. Pat. No. 4,957,759 to Goldenberg et al.

As depicted by FIG. 1b, retro-reflectors have been commonly used in projection systems having an optical axis 17. A spherical retro-reflector 16 is placed behind the source 11, typically an arc lamp, with the arc 11a placed at the center of curvature 19 of the spherical retro-reflector 16. This orientation causes the light collected at the back of the source 11 to be imaged back through the arc 11a itself and be collected by condensing optics 18, such as lenses, at the front of the system. Such a retro-reflector 16 would effectively double the brightness being delivered to the condensing optics under the ideal circumstances, and in practice typically leads to around a 60% to 80% increase in flux density at the target surface 13.

To improve the flux density of the light delivered by the a reflector-based condensing system such as in FIG. 1a, a compound reflector system as shown by FIG. 2 has been developed by the prior art. Referring to FIG. 2, such a compound reflector system has on the opposite side of the source 21 from the target surface 23 an ellipsoidal primary reflector 22 which collects light from the source 21 located at a first focus 24 an reflects it toward a second focus 25. A concave spherical retro-reflector 26, situated with its center of curvature 29 being coincident with the first focus 24, collects a portion of the radiation emitted by the source 21 and reflects it back through the source 21 such that its effective flux density is nearly doubled. This retro-reflected light is then collected by the ellipsoidal primary reflector 22 same as the original light and delivered to the second focus 25, thus increasing the overall flux density at the target surface 23.

FIG. 3 shows another configuration of such a compound reflector system where the concave spherical retro-reflector 36 is placed behind the source 31 and the ellipsoidal primary reflector is placed between the source and the target surface 33. As with the compound reflector system depicted by FIG. 2, the source 31 is located near the first focus 34 of the primary reflector 32 and the center of curvature of the retro-reflector 36, and the target surface is placed near the second focus 35. Flux density at the target surface 33 in this case is also nearly doubled when compared to the case with no retro-reflection.

Although both the systems depicted by FIGS. 2 and 3 employ concave spherical retro-reflectors to increase the flux density at the target surface, the compound reflector system used in both is intricate and costly to manufacture. Furthermore, proper alignment between the lamp and the reflector is difficult. Thus, there remains a need in the art for an optimized system and method for optical condensing and collecting which increases the flux density of radiation emitted by a source toward a target surface which is simple and inexpensive to manufacture.

SUMMARY OF THE INVENTION

The present invention provides a method and system for condensing and collecting electromagnetic radiation to increase flux density at a target surface. Systems according to the present invention comprise a source of radiation emitting substantially uniform radiation flux, such as an arc lamp, a primary reflector having a substantially concave shaped reflective surface, a focal point, and an optical axis, and a retro-reflector having a non-concave shaped reflective surface. According to the present invention, the substantially concave shape of the primary reflector and the non-concave shape of the retro-reflector are chosen such that the two shapes are complementary. That is, the shapes of the primary reflector and retro-reflector are such that light directed from the primary reflector will intersect the non-concave reflective surface of the retro-reflector at a right angle such that the light hitting the retro-reflector will be returned to the source substantially along its original path.

The method of the present invention comprises the steps of emitting radiation from a source, collecting the radiation with a substantially concave shaped primary reflector and redirecting the emitted radiation in at least two portions toward a target surface, such as the input end of a fiber optic, a field homogenizer, or a lens. The method further comprises reflecting at least one of the portions of radiation redirected by the primary reflector substantially back along its original path and through the source using a non-concave retro-reflector which is shaped complementary to the primary reflector.

The present invention overcomes the disadvantages and drawbacks present in the prior art in that it efficiently condenses a light onto a target surface with high flux density without the need for costly and complicated compound reflectors or condensing lenses. The above and other advantages, features and aspects of the invention will be more readily perceived from the following description of the preferred embodiments thereof taken together with the accompanying drawings and claims. The present invention is illustrated by way of example and not limitation in the drawings, in which like reference numerals indicate like parts.

BRIEF DESCRIPTION OF THE DRAWINGS

FIGS. 10a–10f are schematic views of a plurality of polygonal lightguide (waveguide) targets in cross-sections which may be employed in embodiments of the present invention.

FIG. 11 is a schematic view of a circular cross-section lightguide target which may be utilized in the present invention.

FIG. 12a is a schematic side view illustrating an increasing taper lightguide target according to one embodiment of the invention.

FIG. 12b is a schematic side view illustrating a decreasing taper lightguide target in accordance with another embodiment.

FIG. 13 is a schematic cross-section of a hollow tube lightguide homogenizer which may be utilized in the present invention.

FIG. 14 is a schematic side view of an embodiment which may be utilized with the invention in which the target surface is an input end of a lens.

DETAILED DESCRIPTION OF THE INVENTION

Figure 4:
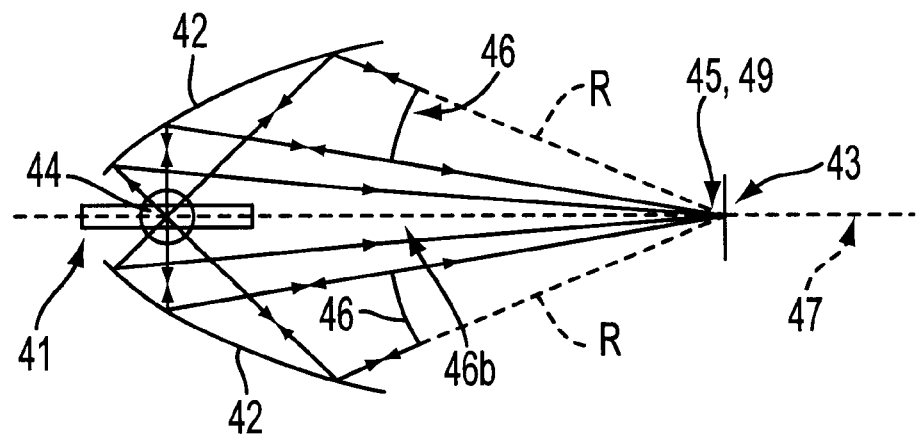
FIG. 4 is a schematic diagram of a first embodiment of the present invention wherein a substantially concave ellipsoidal primary reflector is paired with a complementary convex spherical retro-reflector.
Figure 4A:
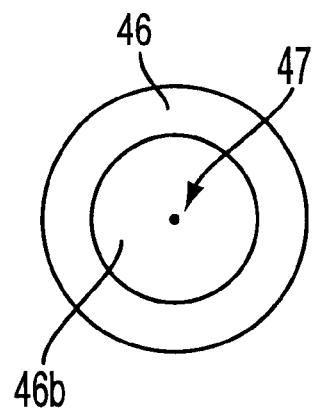
FIG. 4a is a schematic diagram depicting the retro-reflector of FIG. 4 as seen along the optical axis of the primary reflector to further illustrate its ring shape in that embodiment of the present invention.

FIGS. 4 and 4a depict a first preferred embodiment of the present invention comprised of a substantially concave primary reflector 42 having an ellipsoidal shape with symmetry along an optical axis 47. A source 41 comprising an arc lamp is placed with its arc gap at a first focus 44 of the reflector 42 such that the axis of the lamp is collinear with the optical axis 47 of the ellipsoidal primary reflector 42.

As depicted in the figure, the primary reflector 42 preferably is a section of an ellipsoid such that it collects a majority of the light emitted from the source 41 arc lamp. As will be appreciated by one skilled in the art, since the source 41 is at the first focus 44 of the ellipsoid, all the emitted light will be collected and directed to the second focus 45 of the ellipsoid. To increase the flux density of light at the target surface 43, a convex spherical retro-reflector is placed in the path of the output from the primary reflector 42 between the first and second focus 44 and 45 such that its center of curvature 49 is located at the proximity of the second focus 45.

This particular orientation of a spherical convex retro-reflector 46 and a substantially concave ellipsoidal primary reflector 42 is complementary in that all the light incident upon the reflective surface of the spherical retro-reflector 46 will be intersecting it at right angles. As a result, the light incident on the convex spherical retro-reflector 46 will be reflected 180° substantially retracing its own path back to the ellipsoidal primary reflector 42 and back into the arc itself, thus performing the retro-reflection function. In the preferred embodiment as depicted in FIGS. 4 and 4a, an aperture 46b at the center of the convex spherical retro-reflector 46 is made to provide a high flux density and low numerical aperture light output to the target surface 43. As shown in FIG. 4a, this aperture 46b is made symmetric about the optical axis 47 of the primary reflector 42 to ensure that all retro-reflected light exits the aperture 46b such that it can be collected at the target surface 43. As will be appreciated by one skilled in the art, this aperture 46b can be of any shape which is symmetrical about the optical axis 47, but preferably the aperture 46b is circular as shown in FIG. 4a such that the retro-reflector 46 when viewed along the optical axis 47 has a ring shape.

Figure 5:
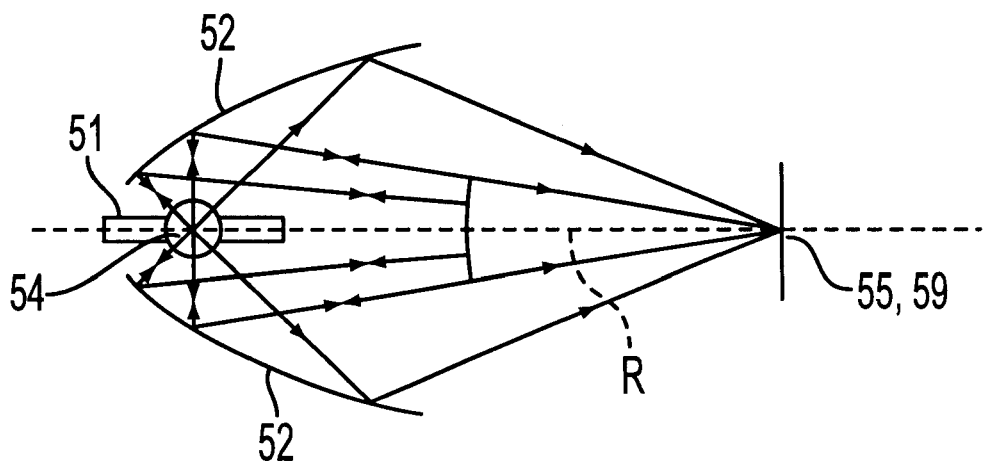
FIG. 5 is a schematic diagram of a second embodiment of the present invention wherein a substantially concave ellipsoidal primary reflector is paired with a complementary convex spherical retro-reflector.
Figure 5A:
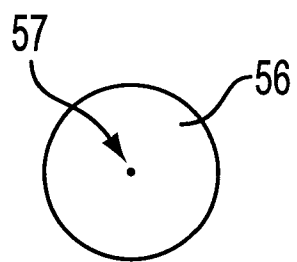
FIG. 5a is a schematic diagram depicting the retro-reflector of FIG. 5 as seen along the optical axis of the primary reflector to further illustrate its disk shape in that embodiment of the present invention.

FIGS. 5 and 5a schematically depict an alternative embodiment of the present invention which is similar to the previous embodiment in that it employs an ellipsoidal primary reflector 52 reflecting light from an arc lamp source 51, located at a first focus 54, onto a target surface 53, located at a second focus 55. Instead of using a ring shaped retro-reflector, the spherical substantially convex retro-reflector 56 having its center of curvature 59 substantially at the second focus 55 in this alternative embodiment is a solid disk shape centered at the optical axis 57 when viewed along the axis 57, as shown in FIG. 5a. The output is taken outside this convex spherical retro-reflector 56 with increased flux density at the target surface due to the retro-reflection.

Figure 1A:
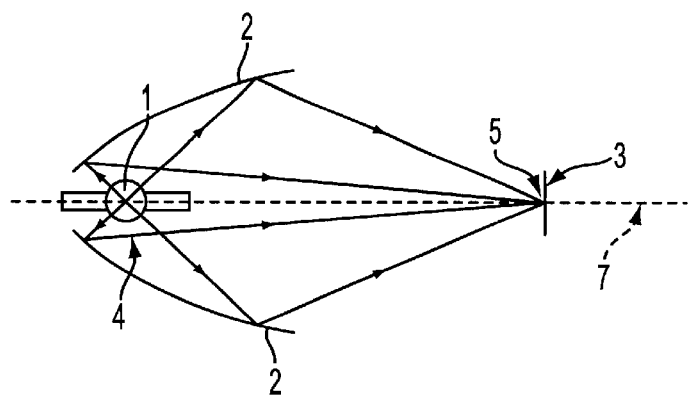
FIG. 1a is a schematic diagram of a traditional on-axis ellipsoidal reflector condensing and collecting system as is known in the art.
Figure 2:
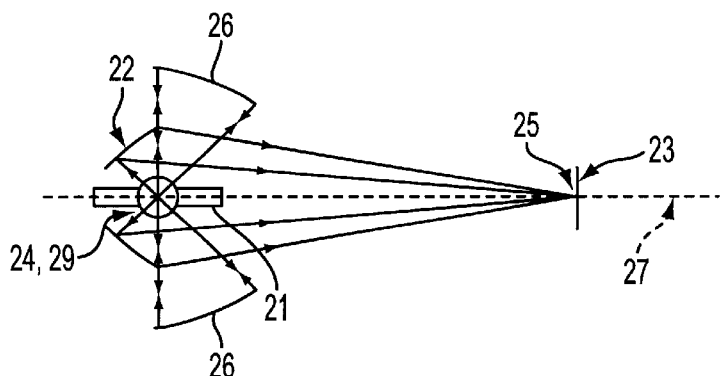
FIG. 2 is a schematic diagram of a first embodiment of an on-axis compound reflector condensing and collecting system as is known in the art.
Figure 1B:
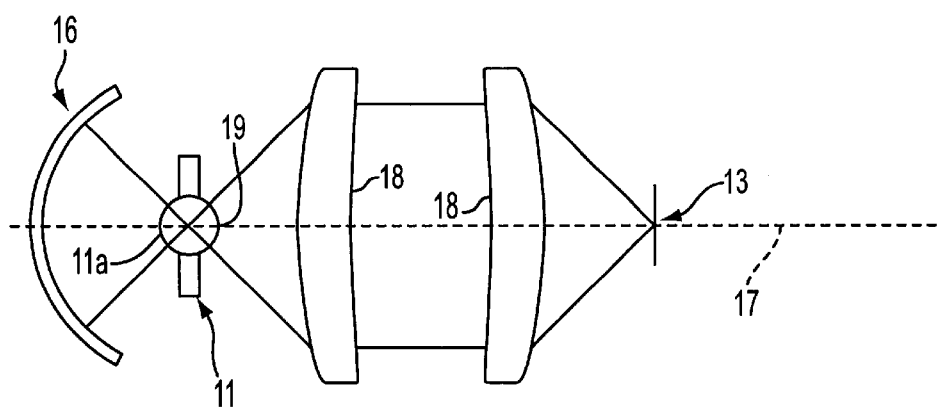
FIG. 1b is a schematic diagram of a condensing and collecting system employing lenses and a spherical retro-reflector as is known in the art.
Figure 3:
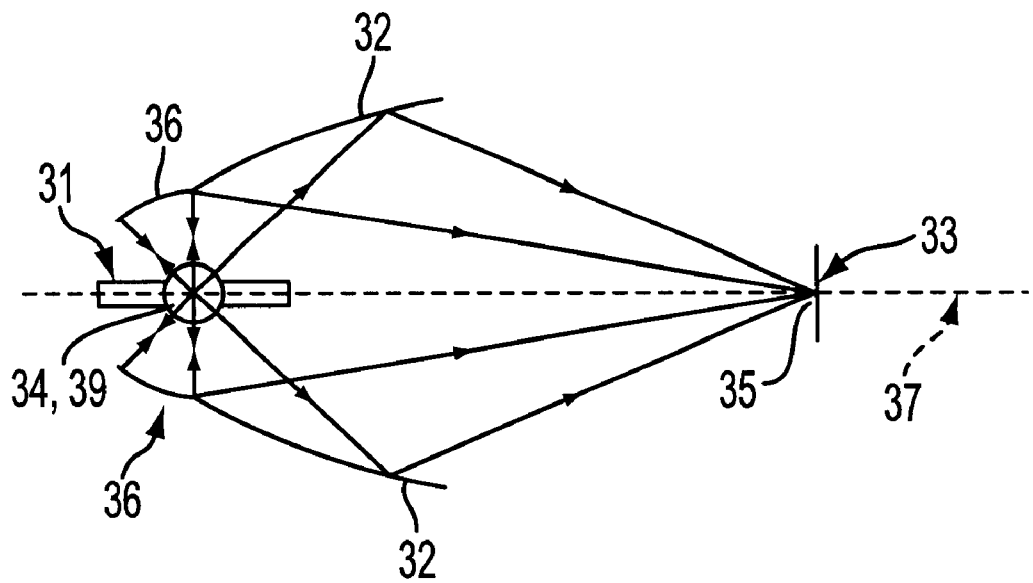
FIG. 3 is a schematic diagram of a second embodiment of an on-axis compound reflector condensing and collecting system as is known in the art.
Figure 6A:
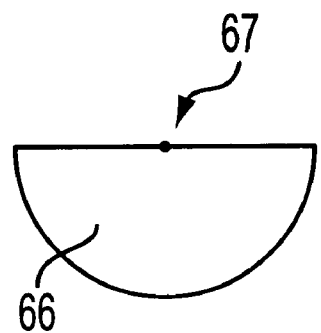
FIG. 6a is a schematic diagram depicting the retro-reflector of FIG. 6 as seen along the optical axis of the primary reflector to further illustrate its partial disk shape in that embodiment of the present invention.
Figure 6:
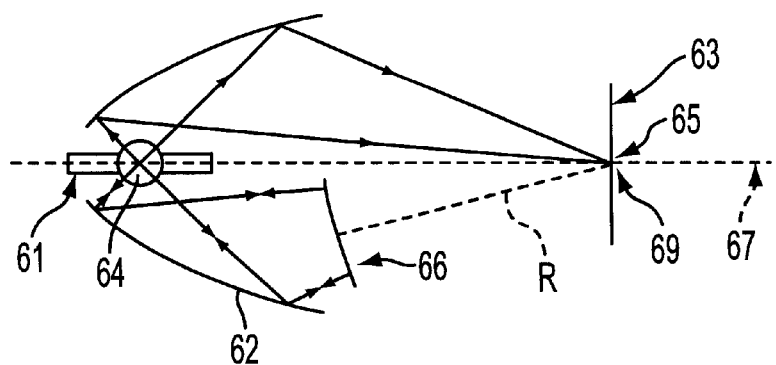
FIG. 6 is a schematic diagram of a third embodiment of the present invention wherein a substantially concave ellipsoidal primary reflector is paired with a complementary convex spherical retro-reflector.

FIGS. 6 and 6a schematically depict another alternative embodiment of the invention in which a convex spherical retro-reflector 66 is paired with a substantially concave ellipsoidal primary reflector 62. As seen in the figures, the retro-reflector 66 is appears to have a half disk shape when viewed along the optical axis 67. This configuration essentially divides the initial light output from the primary reflector 62 into two halves such that a first half of the light output (depicted as the bottom half in the figures) is reflected back into the primary reflector 62. All the light delivered to the target surface 63 exits from the non-restricted (depicted as the upper half) portion of the primary reflector 62.

Figure 7:
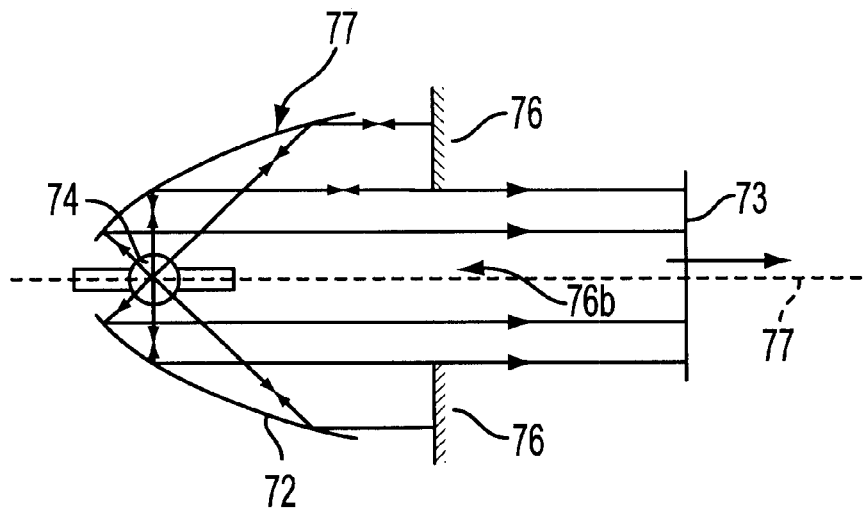
FIG. 7 is a schematic diagram of an fourth embodiment of the present invention wherein a substantially concave paraboloidal primary reflector is paired with a complementary planar retro-reflector.
Figure 7A:
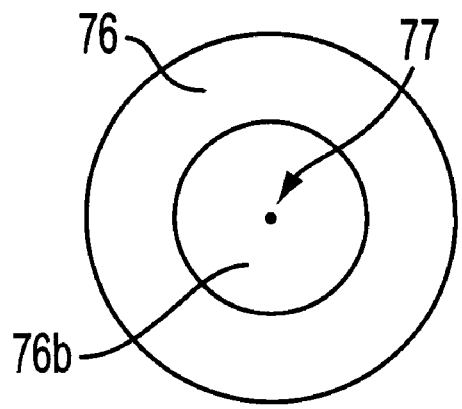
FIG. 7a is a schematic diagram depicting the retro-reflector of FIG. 7 as seen along the optical axis of the primary reflector to further illustrate its ring shape in that embodiment of the present invention.

FIGS. 7 and 7a schematically depict a second preferred embodiment of the present invention comprised of a substantially concave primary reflector 72 having a paraboloidal shape with symmetry along an optical axis 77. Similar to embodiments employing ellipsoidal primary reflectors, a source 71 comprising an arc lamp is placed with its arc gap at the focus 74 of the primary reflector 72 such that the axis of the lamp is collinear with the optical axis 77 of the paraboloidal primary reflector 72.

As shown in FIG. 7, a retro-reflector 76 comprising a substantially planar reflective surface is placed perpendicular to the optical axis 77 of the paraboloidal primary reflector 72. As will be appreciated by one skilled in the art, it is a natural property of a substantially concave paraboloidal reflector that light emitted at its focus will be collimated into a plurality of rays all traveling parallel to the reflector's optical axis. Therefore, a planar retro-reflector 76 oriented perpendicular to the optical axis 77 is complementary to the paraboloidal primary reflector 72 because it will reflect all incident light from the primary reflector 72 180° thus substantially retracing its path back to the source 71.

As shown by FIG. 7a, in this preferred embodiment an aperture 76b is present in the center of the reflector. As with the embodiment of FIGS. 4 and 4a, it should be appreciated that this aperture 76b need not be circular, but preferably is symmetric about the optical axis 77 of the primary reflector 72.

Figure 8:
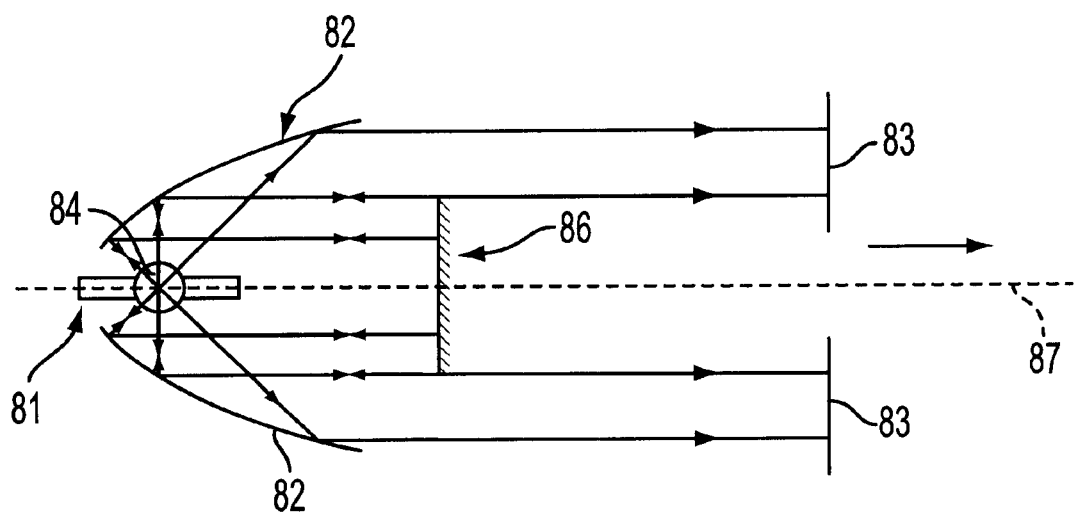
FIG. 8 is a schematic diagram of a fifth embodiment of the present invention wherein a substantially concave paraboloidal primary reflector is paired with a complementary planar retro-reflector.
Figure 8A:
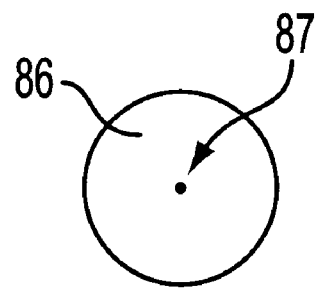
FIG. 8a is a schematic diagram depicting the retro-reflector of FIG. 8 as seen along the optical axis of the primary reflector to further illustrate its disk shape in that embodiment of the present invention.

FIGS. 8 and 8a schematically depict an alternative embodiment of the second preferred embodiment of the invention. In this alternative embodiment, the planar retro-reflector 86 is again fixed perpendicular to the optical axis 87 of the primary reflector 82 between the focus 84 and the target surface 83. However, when viewed along the optical axis 87, it can be seen that the retro-reflector 86 has a solid disk shape centered at the optical axis 87 as depicted in FIG. 8a. Thus, as shown by FIG. 8, all light rays reaching the target surface 83 travel around the outside of the retro-reflector 86.

Figure 9:
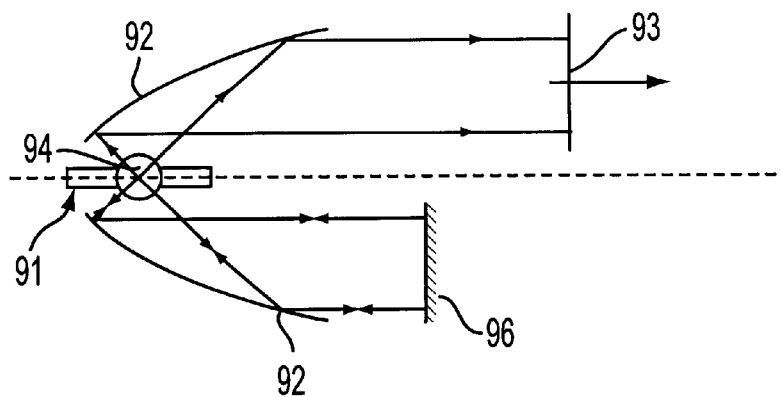
FIG. 9 is a schematic diagram of a sixth embodiment of the present invention wherein a substantially concave paraboloidal primary reflector is paired with a complementary planar retro-reflector.
Figure 9A:
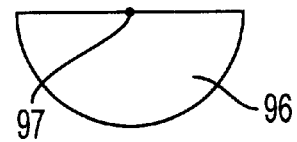
FIG. 9a is a schematic diagram depicting the retro-reflector of FIG. 9 as seen along the optical axis of the primary reflector to further illustrate its partial disk shape in that embodiment of the present invention.

FIGS. 9 and 9a schematically depict another alternative embodiment of the present invention using a parabolic primary reflector 92 and a planar retro-reflector 96. Similar to the embodiment depicted by FIGS. 6 and 6a, the planar retro-reflector 96 has a half disk shape when viewed along the optical axis 97. In an embodiment of the invention employing this type of retro-reflector 96, all the light delivered to the target surface 93 exits from the non-restricted portion of the primary reflector 92. The resulting output will therefore be essentially semi-circular in cross-section and will have higher brightness than the original output without retro-reflection.

In all of the above embodiments, both the primary reflectors and the retro-reflectors can be made from suitable materials having a high reflectivity coating, preferably of metal. The reflectors can also be made with glass and coated with metallic coating, such as silver or aluminum, for broadband applications, or with multi-layer dielectric coatings for applications where only certain wavelengths of radiation are desired to be reflected. For example, a broadband visible coating for white light output, a blue or UV coating for curing of epoxies, or other wavelength specific coatings suitable for other particular applications.

Suitable sources according to embodiments of the present invention are any radiation source which emits substantially uniform high intensity radiation from a small area, such as an arc lamp. A particularly suitable arc lamp for use in embodiments of the present invention will have an arc gap which is small relative to the focal length of the primary reflector. Preferably, for fiber optic applications the, source comprises a high intensity arc lamp having an arc gap length on the order of about 1 mm to about 6 mm. Such lamps can be mercury lamps, mercury xenon lamps, xenon lamps, metal-halide lamps, HID lamps, tungsten halogen, or halogen lamps, or arc lamps having various dopants such as sodium. Those of ordinary skill in the art will readily appreciate that the lamp type and power rating should be chosen based upon particular application of the present invention.

The target surface according to embodiments of the present invention can be any surface upon which it is desirable to provide with concentrated radiation flux. Such surfaces, for example, can be, but are not limited to, the surface of a lens, the input surface of light guides, which can be a single fiber or a fiber bundle, homogenizers, hollow internally reflective tubes and other fiber optics, light guides and combinations thereof.

For example, in situations where it is desired to deliver light into a fiber optic made of low temperature plastic based materials, redistributing the profile of the radiation flux at the target surface with a homogenizer before introducing it into the fiber optic will help to prevent scorching of the fiber optic material. This is especially useful in embodiments of the present invention which use ellipsoidal primary reflectors as a highly concentrated spot of light is produced at the target surface.

Suitable homogenizers for use in the present invention can any intensity profile or numerical aperture transforming devices which also serve as lightguides. Suitable homogenizers for use in embodiments of the present invention include tapered or untapered polygonal waveguides, tapered single core optical fibers (such as cladded rods), a fused bundle of optical fibers, or a randomized fiber bundle.

Suitable lightguides I can be polygonal in cross-section as shown in FIGS. 10a–10f or circular in cross-section as shown in FIG. 11. Further, lightguide I can be an increasing taper lightguide as shown in FIG. 12a or a decreasing taper lightguide as shown in FIG. 12b. Additionally, lightguide I can be a hollow tube homogenizer as shown in FIG. 13 having reflective inner walls R, or the target I can be an input end S of a lens L as shown in FIG. 14.

For embodiments of the present invention wherein paraboloidal primary reflectors are employed, the output can be redirected at the target surface into such fiber optic lightguides by using focusing lenses or reflectors as is known. in the art.

Since reflectors having an exact ellipsoidal shape as in the embodiments depicted by FIGS. 4–6 can be expensive to make, the ellipsoidal shaped substantially concave surface can be approximated by the use of spherical mirrors, or toroidal mirrors as taught by U.S. Pat. Nos. 5,414,600, 5,430,634, and 5,757,431, the disclosures of which are herein incorporated by reference. As taught be these references, the amount of degradation in coupling of light to the target surface depends critically on the dimensions of the system (e.g., the target surface to source distance) and the relative numerical apertures of the primary reflector and target surface.

As will be appreciated by one skilled in the art, the distance between the source and the target surface (thus, the dimensions of the ellipsoidal primary reflector) can be chosen such that a desired amount of magnification and desired numerical aperture is obtained at the target surface. Preferably, the magnification factor and numerical aperture of the system is chosen such that the output of the light at the target matches the input characteristics of the target (such as the critical numerical aperture of a fiber optic which is placed near the target surface).

While the present invention has been shown and described with reference to preferred embodiments for carrying out the invention, it should be understood that various changes may be made in adapting the invention to different embodiments without departing from the broader inventive concepts disclosed herein and encompassed by the claims which follow.

What is claimed is:

1. A system for condensing and collecting electromagnetic radiation to increase flux density at a target surface, the system comprising:
   a source of radiation emitting substantially uniform radiation flux;
   a primary reflector having a substantially concave shaped reflective surface, a focal point, and an optical axis, said source being located proximate to said focal point, said substantially concave shaped reflective surface collecting a first and second portion of said radiation flux emitted from said source and redirecting said first portion of radiation flux along a first plurality of paths and said second portion of radiation flux along a second plurality of paths; and
   a retro-reflector having a non-concave shaped reflective surface, said non-concave shaped reflective surface being complementary to said substantially concave shaped reflective surface of said primary reflector;
   wherein said first portion of radiation flux radiates along said first plurality of paths to the target surface, said second portion of radiation flux radiates along said second plurality of paths to said non-concave shaped reflective surface of said retro-reflector, said non-concave shaped reflective surface reflects said second portion of said radiation flux back along said second plurality of paths to said primary reflector such that said second portion of said radiation flux is then reflected along said first plurality of paths to the target surface.

2. The system for condensing and collecting electromagnetic radiation according to claim 1, wherein said substantially concave shaped reflective surface has a curvature substantially that of an ellipsoid, and said non-concave shaped reflective surface has a curvature substantially that of a sphere.

3. The system for condensing and collecting electromagnetic radiation according to claim 2, wherein said retro-reflector has a disk shape when viewed along said optical axis.

4. The system for condensing and collecting electromagnetic radiation according to claim 2, wherein said retro-reflector has a ring shape when viewed along said optical axis.

5. The system for condensing and collecting electromagnetic radiation according to claim 2, wherein said retro-reflector has a partial disk shape when viewed along said optical axis.

6. The system for condensing and collecting electromagnetic radiation according to claim 1, wherein said substantially concave shaped reflective surface has a curvature substantially that of a paraboloid, and said non-concave shaped reflective surface is substantially planar.

7. The system for condensing and collecting electromagnetic radiation according to claim 1, wherein said source comprises an arc lamp.

8. The system for condensing and collecting electromagnetic radiation according to claim 7, wherein said arc lamp has an arc gap length which ranges from about 1 mm to about 6 mm.

9. The system for condensing and collecting electromagnetic radiation according to claim 7, wherein said arc lamp is of a lamp type selected from the group consisting of xenon, mercury, mercury xenon, metal halide, HID, tungsten halogen, and halogen.

10. The system for condensing and collecting electromagnetic radiation according to claim 1, wherein the target surface comprises an input end of a optical waveguide.

11. The system for condensing and collecting electromagnetic radiation according to claim 10, wherein said optical waveguide is of a type selected from the group consisting of a single optical fiber, a fused bundle of optical fibers, and a cladded rod.

12. The system for condensing and collecting electromagnetic radiation according to claim 1, wherein said target surface comprises an input end of a homogenizer, said homogenizer accepting radiation flux from said primary reflector and transmitting the radiation to an optical waveguide, and wherein said homogenizer angularly redistributes the radiation flux into a substantially uniform density profile.

13. The system for condensing and collecting electromagnetic radiation according to claim 12, wherein said homogenizer has a circular or polygonal cross-sectional shape.

14. The system for condensing and collecting electromagnetic radiation according to claim 12, wherein said homogenizer is a fiber optic comprised of a material selected from the group consisting of quartz, glass, or high temperature plastic.

15. The system for condensing and collecting electromagnetic radiation according to claim 12, wherein said homogenizer is a hollow tube having reflective inner walls.

16. The system for condensing and collecting electromagnetic radiation according to claim 1, wherein said target surface comprises an input end of a lens.

17. The system for condensing and collecting electromagnetic radiation according to claim 2, wherein said substantially ellipsoidal curvature of said primary reflector is approximated by surface portions having a shape selected from the group consisting of toroidal and spherical.

18. The system for condensing and collecting electromagnetic radiation according to claim 1, wherein at least one of said primary reflector and said retro-reflector selectively reflect only certain wavelengths of radiation.

* * * * *